W. F. LAHEY.
AUTOMOBILE TIRE.
APPLICATION FILED OCT. 21, 1915.
1,209,856.
Patented Dec. 26, 1916.
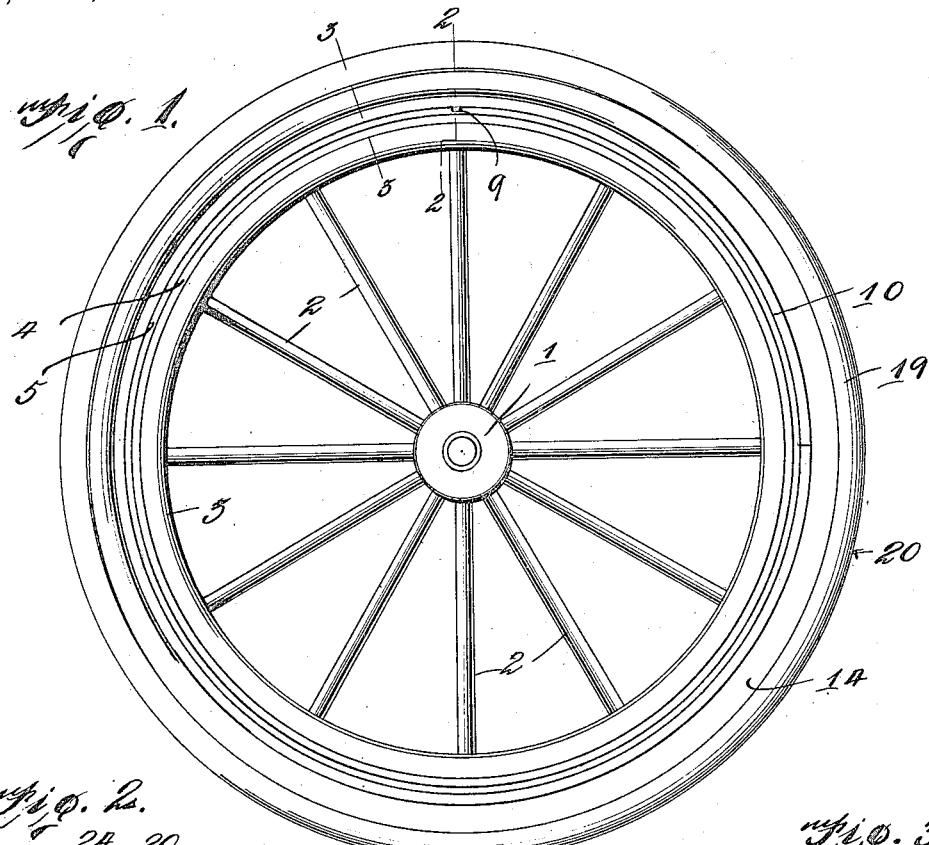
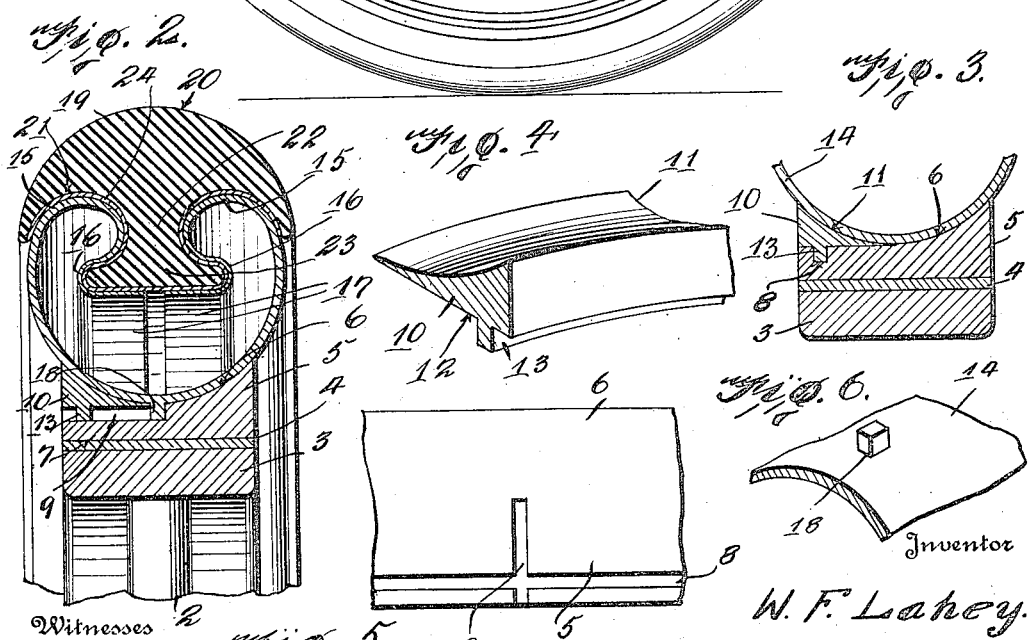

UNITED STATES PATENT OFFICE.

WILLIAM FRANCIS LAHEY, OF EAST HARTFORD, CONNECTICUT, ASSIGNOR OF ONE-THIRD TO ARCHIBALD H. MILLER, OF HOLYOKE, MASSACHUSETTS.

AUTOMOBILE-TIRE.

1,209,856.

Specification of Letters Patent.

Patented Dec. 26, 1916.

Application filed October 21, 1915. Serial No. 57,144.

*To all whom it may concern:*

Be it known that I, WILLIAM F. LAHEY, a citizen of the United States, residing at East Hartford, in the county of Hartford and State of Connecticut, have invented certain new and useful Improvements in Automobile-Tires, of which the following is a specification, reference being had therein to the accompanying drawing.

This invention relates to automobile tires and has for its principal object the production of a resilient tire which is so constructed as to ride very easily over uneven surfaces, and at the same time eliminate the expense and disadvantages of blow-outs, punctures, and the like where a pneumatic tire is used.

Another object of this invention is the production of a tire in which the rubber tread is carried by a resilient tread-supporting tube so that these two elements together owing to their resiliency will give when passing over uneven surfaces thereby providing a cushion tire for the rim of a wheel.

Another object of this invention is the production of an automobile tire which is constructed so as to provide a cushion tire, this device being provided with simple and efficient securing means whereby the several elements will be positively retained in engagement with each other and correctly supported upon the rim of a wheel.

With these and other objects in view this invention consists of certain novel combinations, constructions, and arrangements of parts as will be hereinafter fully described and claimed.

In the accompanying drawing: Figure 1 is a side elevation of the automobile tire. Fig. 2 is a section taken on the line 2—2 of Fig. 1. Fig. 3 is a section partly broken away, taken upon the line 3—3 of Fig. 1. Fig. 4 is an enlarged fragmentary perspective view of a portion of a steel ring used in connection with this device. Fig. 5 is a fragmentary plan view of a portion of one section of the rim. Fig. 6 is a fragmentary perspective view of the tread-supporting tube, illustrating the lug formed thereon.

Referring to the accompanying drawing by numerals it will be seen that the device is used in connection with a wheel which comprises a hub 1, having spokes 2 radiating therefrom so as to carry the felly 3. This felly 3 is provided with an iron or other metallic band 4 which extends therearound so as to efficiently reinforce the felly 3 when the same is in use.

The rim used in connection with this device comprises a primary section and an auxiliary section. The primary section 5 is provided with a concaved face 6 and with a straight inner side 7. The straight inner side 7 fits upon the iron or metallic band 4, as clearly shown in Fig. 2. This primary section 5 is provided with a longitudinally extending channel 8 extending entirely around the primary section 5, as it is circular, as clearly shown by referring to Fig. 1. An intersecting groove 9 is also formed in the section 5 and extends through one side of the primary section 5 of the rim to a point adjacent the central axis thereof, as shown in Fig. 5.

The auxiliary section 10 of the rim is also provided with a concaved face 11 and with a straight inner face 12. This section 10 is formed of metal, preferably spring steel, and is split as shown in Fig. 1. Upon this section 10 extending from the straight side 12 thereof there projects the longitudinally extending rib 13 which extends annularly around the section 10.

The resilient tread-supporting tube used in connection with this device is formed of suitable spring steel and is substantially semi-circular in cross-section. This tube, as shown at 14, is curved inwardly upon each side thereof, as at 15, to provide the pocket portions 16 terminating in lips 17. Therefore, it will be seen that the inwardly curved portions 15, the pockets 16 and lips 17 will form a receiving portion as clearly disclosed in Fig. 2, since these elements are formed upon the tube so as to be carried at a spaced distance apart. This tube 14 is, of course, circular in side elevation and is provided upon its inner periphery with the integral lug 18.

The rubber tread 19 is provided with a circular outer face 20. The tread 19 is also provided with the annular sockets 21 formed upon each side of the neck 22 upon which the flat head 23 is formed. A reinforcing sheet of any suitable metal as shown at 24, is positioned upon the inner portions of the tread 19 so as to embrace the head 23 and neck 22 and fit within the sockets 21.

When this device is assembled the sheet metal 24 is first positioned upon the tread as above set forth. The curved portions 15 of the tube 14 may then be sprung apart so as to allow the head 23 of the tread 19 to pass between the curved portions 15 and into the pockets 16 of the tube. Of course, as soon as the head passes between the curved portions 15 and into the pockets 16 the resiliency of the tube will cause the curved portions, the pockets, and the lips to spring to their normal positions and fit snugly upon the neck and head of the tread 19 since these elements conform in shape to the contour of each other, as clearly shown in Fig. 2. Therefore, by this construction it will be seen that the tread will be positively locked in engagement with the tube when it is desired to assemble the device. At this time the section 5 of the rim will be carried upon the metallic band 4 of the wheel and will be retained in position by any suitable means not being deemed necessary to be herein disclosed.

The tube and tread after being assembled together are then ready for mounting upon the wheel. This is accomplished by passing the lug 18 of the tube 14 into the transversely extending groove 9 so as to allow the tube 14 to engage the concaved face 6 of the primary section 5 of the rim. The auxiliary section 10 is then forced into its assembled position by slightly springing the tube 14. By the springing of the tube 14 it will be seen that sufficient space is provided for the rib 13 to pass over the portions of the primary section 5 adjacent the channel 8. As soon as the rib comes into engagement with the channel 8 it will be seen that the resiliency of the tube 14 will cause the rib 13 to spring into the channel 8 and in this manner the section 10 will be locked in its correct position, at which time it will further be seen that the tube 14 will be bearing upon the concaved face 11 of section 10, as clearly shown in Figs. 2 and 3. While the resiliency of the tube 14 is sufficient to retain the rib 13 within the channel 8 and in this manner prevent the accidental displacement of the auxiliary section 10 of the rim it will further be seen that the concaved faces of the sections 5 and 10 will constitute a circular face upon which the tube will snugly fit so as to allow these concaved faces to constitute an efficient receiving rim for the tire. Furthermore, it will be seen that the inner edge of the section 10 of the rim will bear against the lug 18 of the tube 14 and will in this manner hold the lug within the inner end of the groove 9. It is, of course, obvious that the object of this lug fitting within the groove 9 is to retain the tire from creeping upon the rim when the same is in operation.

From the foregoing description it will be seen that a very efficient automobile tire has been produced wherein the several elements after being assembled will be positively retained in this position so as to efficiently operate. Furthermore, the engagement of the tube in connection with the neck 22 and head 23 of the tread 19 is such that the tread will be positively retained in engagement with the tube so that when the device is in use the resiliency of the tube as well as the tread 19 will allow the tire to give when passing over uneven surfaces so as to provide a cushion tire for the wheel, and at the same time will eliminate tire troubles which are common in the art of pneumatic tires such for instance as punctures, blow outs, and the like.

What is claimed is:

In a tire of the class described, the combination of a resilient tread-supporting tube, said tube being adapted to fit upon the rim of a wheel, said tube being substantially semi-circular in cross-section, said tube being curved inwardly at its outer portions, thereby forming a reduced entrance into said tube, said tube being further curved in opposite directions to form pockets, said pockets being oppositely arranged with respect to each other, and being farther apart than the distance between the inwardly curved outer portions of said tube at said entrance, lips formed upon the inwardly curved portions of said tube adjacent said pockets, a tread positioned upon said tube, said tread having a pair of annular sockets, a neck extending from the center of said tread, a flat head formed upon said neck, said inwardly curved outer portions fitting within said sockets and gripping said neck, said head fitting within said pockets and bearing upon said lips, whereby said tread is demountably held by said tube without the employment of secondary securing means.

In testimony whereof I hereunto affix my signature.

WILLIAM FRANCIS LAHEY.

Copies of this patent may be obtained for five cents each, by addressing the "Commissioner of Patents, Washington, D. C."